Figure 8:
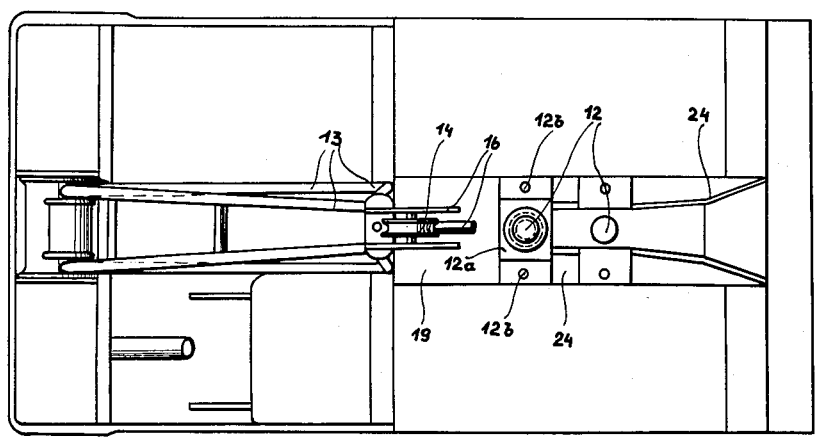

Dec. 27, 1955     O. HACKER     2,728,472
SADDLE-TRACTOR
Filed March 1, 1951     4 Sheets-Sheet 1
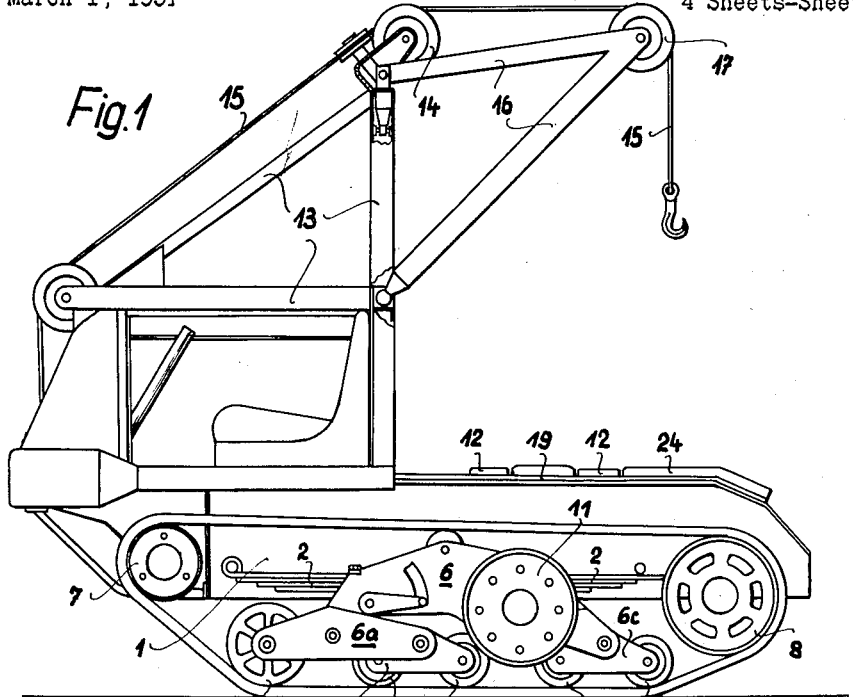
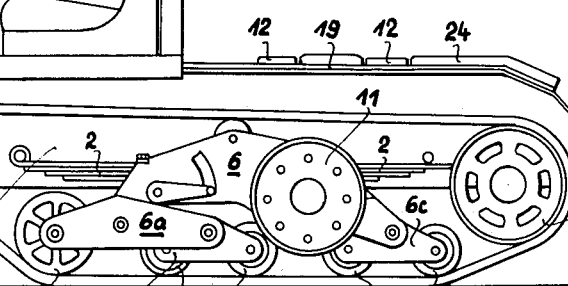
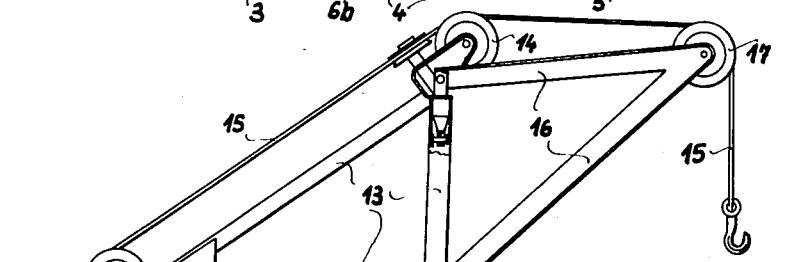
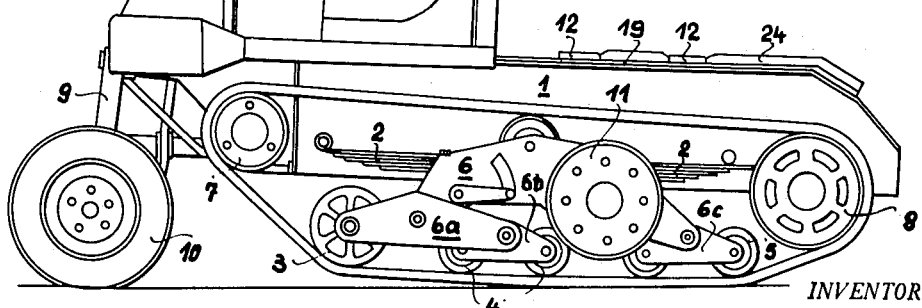
INVENTOR.
OSKAR HACKER.
BY K. B. Mays
ATTORNEY.

Dec. 27, 1955  O. HACKER  2,728,472
SADDLE-TRACTOR
Filed March 1, 1951  4 Sheets-Sheet 2
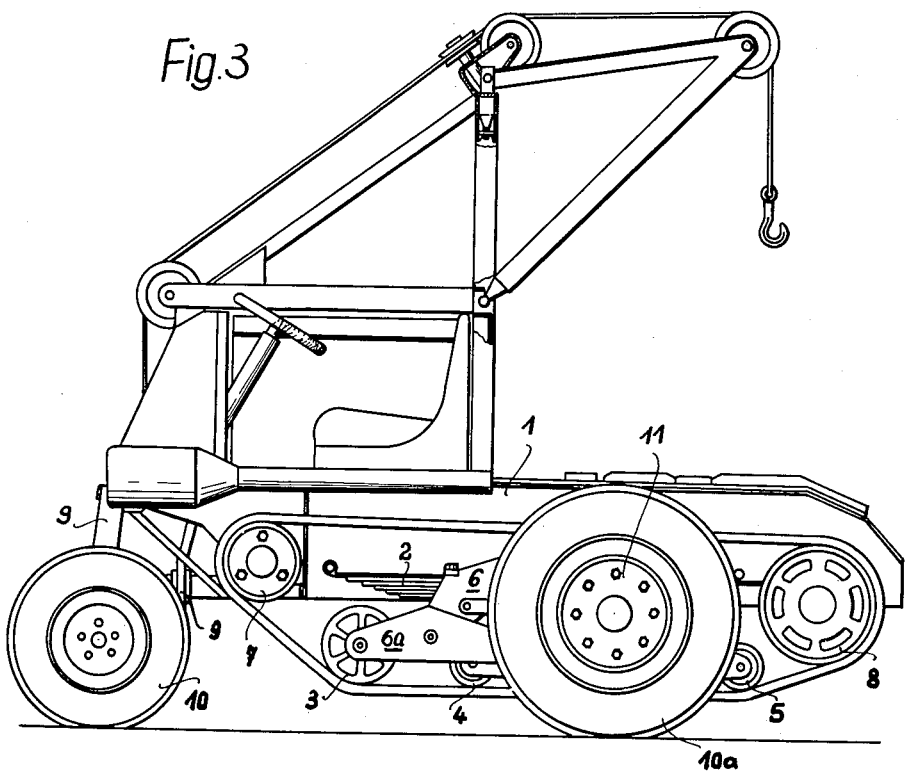
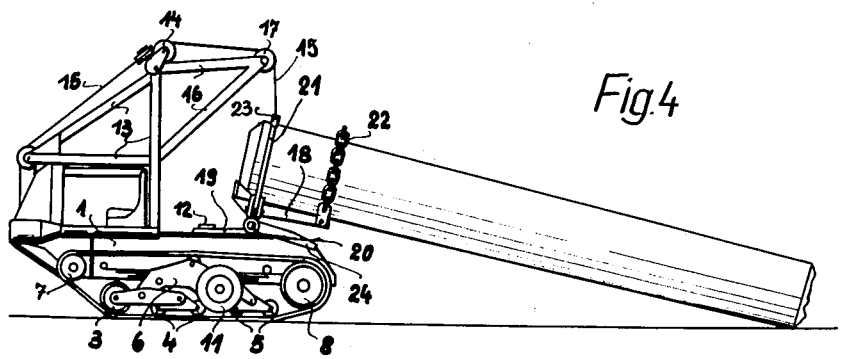
INVENTOR.
OSKAR HACKER.
BY K. A. Mayr
ATTORNEY.

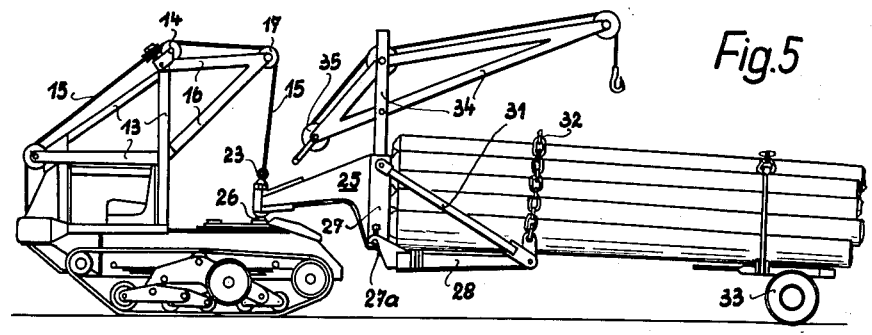
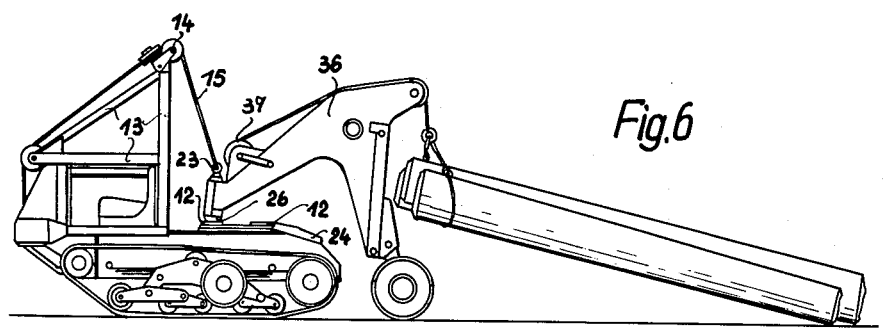
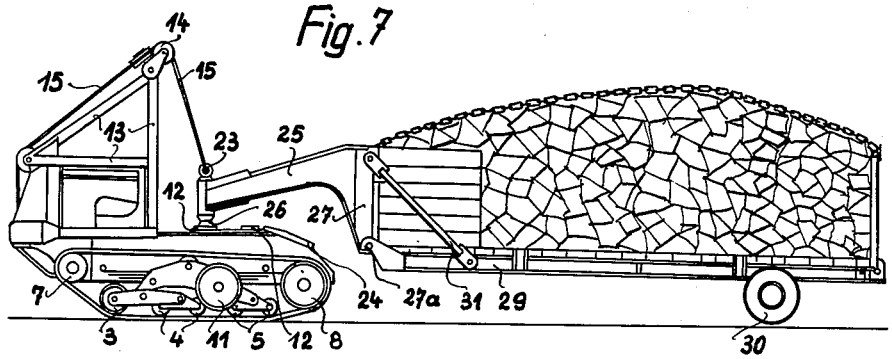

Dec. 27, 1955  O. HACKER  2,728,472
SADDLE-TRACTOR
Filed March 1, 1951  4 Sheets-Sheet 4

INVENTOR.
Oskar Hacker
BY K. A. Mayr.
Attorney.

ular assembly with the tractor, is coupled for relative angular movement to the tractor by means of the central ball pivot 26 fitting into a mating socket of bearing 12, and is laterally stabilized by rollers 20. These rollers 20 are arranged with some play relative to platform 19 so as not to restrict its rocking movement on the ball pivot, which movement it must be able to perform in order to adapt itself to irregularities in the ground.

United States Patent Office 2,728,472
Patented Dec. 27, 1955

2,728,472
SADDLE-TRACTOR
Oskar Hacker, Vienna, Austria

Application March 1, 1951, Serial No. 213,331

Claims priority, application Austria October 12, 1950

3 Claims. (Cl. 214—85.1)

The invention provides improvements in a saddle tractor which comprises a frame mounting two track belts, bearing means arranged on said frame vertically above the area defined by the points of support of the tractor on the ground, and a saddle element having an upright pivot detachably inserted in said bearing means to connect said saddle element to and support it on said frame.

It is an object of the invention to locate the bearing means for the pivot so as to be easy of access and suitable for the connection thereto of a wide range of saddle elements of different construction and to be arranged vertically above the area defined by the points of support of the tractor on the ground even during a steep climb, and yet reasonably close to the rear end of the tractor to avoid interference between the saddle or load and the tractor during steep downhill travel.

To this end the invention provides a platform carried by the tractor frame at the top of the rear part of the tractor and bearing means carried by said platform and providing at least two bearing points spaced in the longitudinal direction of the tractor and located above said track belts vertically above the area defined by the points of support on the ground, said pivot being detachably inserted in said bearing means selectively at any of said bearing points.

Additional features of the invention relate to means provided in addition to the pivot for supporting and stabilizing the saddle element on the platform, and to means for connecting a load to the saddle element.

Finally the invention provides a novel method of hauling a load whereby the features of the novel tractor are utilized to best advantage. This method comprises connecting the load to a saddle element, backing a rope-winch carrying tractor close to the saddle element, connecting the rope of the rope winch to said saddle element to hoist said saddle element having said load connected thereto to the tractor, and pivotally supporting said saddle element at the top of the rear part of the tractor at a point lying vertically above the area defined by the points of support of said tractor on the ground.

The invention of a saddle-tractor is hereinafter more fully explained in connection with the embodiment preferred and illustrated in the accompanying drawings.

Figure 9:
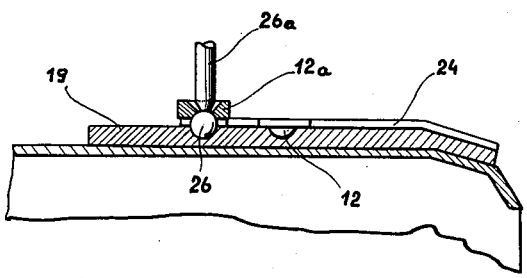
Figure 10:
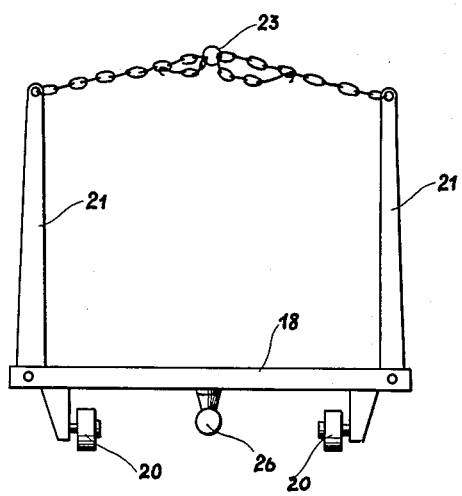

This saddle-tractor is shown in Fig. 1 as a mere tracklaying vehicle, in Fig. 2 as a wheel and tracklaying vehicle or a so-called hermaphrodite vehicle, and in Fig. 3 as a mere wheeled vehicle. In addition the saddle-tractor is shown in Fig. 4 loaded with timber, in Fig. 5 loaded with logs, in Fig. 6 with a loaded logging arch, and in Fig. 7 with a platform loaded with split logs. Finally Fig. 8 is a top plan view of the tractor shown in Fig. 1, Fig. 9 a longitudinal sectional view of the platform, and Fig. 10 a view of a saddle element consisting of a turntable. It is noted that the basic tractor, shown in Fig. 1, is the same in all cases, Figs. 2 and 3 differing therefrom only by the arrangement of the dirigible wheels 10 with their associated steering mechanism, and of the road wheels on hubs 11. Whereas Figs. 4 to 7 show the tractor only in the form of Fig. 1, it is obvious that these tractors could easily be converted to the forms of Figs. 2 or 3, if desired.

The chassis 1 is, on each side, supported by two plate springs 2 resting on a flexible quintuple running gear, whose rollers 3, 4, 5 are mounted on supporting beams 6a, 6b, 6c and are thus individually movable. The parts projecting above the upper rim of the chassis 1, such as engine, radiator, cable-winch, drivers' seats, operating levers, etc., are arranged in the front half of the chassis. The rear half, above the upper rim, is free from any mechanical parts. According to Fig. 2, a wheel and tracklaying vehicle or hermaphrodite vehicle is made by the detachable fixing of an additional front-wheel chassis 9 with dirigible wheels 10. On the rear half of the supporting beam 6, driven wheel hubs 11, the brake-drum hubs of the brake of the track running-gear, are provided. By attaching wheels 10a to these wheel hubs 11 a mere wheeled vehicle is made, as illustrated in Fig. 3. This makes it possible to increase the speed for instance from 10 to 25 kilometers or from 6 to 16 miles.

The tractor frame carries above the tracks at the top of the rear part of the tractor a platform 19, on which are provided above the tracks and vertically above the area defined by the points of support of the tractor on the ground the sockets of two load carrying bearings 12 spaced in the longitudinal direction of the tractor. In the tractor arranged as shown in Fig. 1 the points of support on the ground are defined by rollers 3 and 5 resting on the inside of the track belts; in the arrangement of Fig. 2 they are defined by wheels 10 and rollers 5, and in the arrangement of Fig. 3 by wheels 10 and 11. Hence it is apparent that to fulfill the afore-mentioned requirement concerning the position of bearings 12 with regard to the area defined by the points of support of the tractor on the ground at least one of bearings 12 is arranged on a vertical transverse plane extending between the foremost rollers 3 and the axle for hubs 11, which axle in turn is arranged between rollers 3 and 5. In this case said requirement will be fulfilled when the saddle element is mounted in either of bearings 12 when the tractor is running downhill on tracks, and when it is mounted in the forward bearing when the tractor is running uphill or on road wheels mounted on hubs 11. By the arrangement of the bearing 12 within the center of the supporting area of the tracks it is achieved that a part of the effective load is taken over by the tractor. Thus the necessary adhesion to the ground is imparted to the vehicle. In addition, the otherwise detrimental moment of rearing up at the start is eliminated. The steering and travelling movements of the tractor are not impaired by the load or its running resistance.

On the front half of the tractor, a gantry 13 with an elevated guide pulley 14 is mounted. By means of the cable 15, guided over this elevated pulley, and of the cable-winch, arranged on the front end of the vehicle, the saddle element, which is connected with the load so as to form a rigid unit is mounted on the tractor. In order to allow the hoisting of loads lying beside the tractor, the gantry frame has pivotally mounted thereon a jib arm 16 carrying a pulley 17. As shown in Fig. 4, a rotary stanchion may be used as a saddle element mainly for hauling long loads, e. g., long timber. This stanchion comprises a supporting plate 18, carrying, in its center a ball pivot 26 inserted, for instance, in the rear one of the two bearings 12, and on its sides two rollers 20 stabilizing said plate laterally on platform 19. In Fig. 4 the view of the rear bearing 12 is obstructed by the left-hand roller 20. Plate 18 is furnished with side stakes 21 and a connecting chain 22. The rotatable stanchion, connected with the load of timber and thus forming a rigid unit, is fastened to the cable 15 with the connecting part for the two chains holding the side stakes 21 together, hoisted, and mounted. 24 indicates a beveled guide surface of the vehicle for raising the front end of the ready load unit. Between the two rollers 20 the plate 18 carries at its center a vertical ball pivot 26, which after its insertion in one of bearings 12 is secured against lifting out of the same by known means preventing the ball of the pivot from lifting out of the bearing while permitting of limited universal movement of the pivot in the bearing. Such means are shown illustratively in Figs. 8 and 9 as comprising a cover member 12a mounted with screw bolts 12b at the top of bearing 12 and having an aperture through which pivot pin 26a extends with play whereas the pivot ball 26, of larger diameter, cannot pass through said aperture. According to Figs. 5 and 7 the saddle element is constructed as a bracket 25. Such part of the bracket as carries the ball-pivot 26 is furnished with a fixing device 23 for the cable 15. The rear part of the bracket forms a cross piece 27. The carrying plate 28 or the platform 29 connected with the two-wheeled truck 30 respectively is hooked into the cross piece. The bracket 25 and the carrying plate 28 or the platform 29 respectively are connected by braces 31 making a rigid unit. The load of logs, as illustrated in Fig. 5, supported at its rear end by the trailing axle 33, and the saddling device 25, 28, 31 form a rigid ready load unit by means of the chain 32. According to Fig. 7, the bracket 25 together with the platform 29, loaded with split logs, and with the truck 30, forms a rigid ready load unit. As shown in Fig. 5, the bracket 21 is, for the purpose of alleviating the loading, adapted to carry a jib 34, which makes the saddling device independent of the tractor. This jib has a separate winch 35 and is at any time removable.

Fig. 6 shows the saddle-tractor in combination with the known logging arch 36. It is connected with the tractor by means of the pivot 26 and the bearing 12 of a ball and socket joint arranged in the center of the vehicle for carrying the saddle load. The cable 15 can be connected with the logging arch at 23. The arch is furnished with a separate cable-winch.

If necessary, cable drums, serving as auxiliary winches can be screwed on to the wheel hubs 11 of the tractor.

As the tractor has a free platform on its rear half, as described above, the auxiliary implements necessary for mechanizing the processes of felling topping off branches, disbarking, and bucking, such as an electric generator for chain saws or an air compressor for pneumatic tools, can be transported to the remotest clearings, whereby even heavy implements can be loaded and unloaded without effort by means of the cable-winch and the jib. Thus even complete cable-winch sets of cable-cranes etc. can be transported to otherwise in accessible heights without the necessity of disassembling them.

It is understood that the invention is not restricted to the illustrative embodiments and arrangements shown, which may be modified in various ways by measures obvious to men skilled in the art within the scope of the appended claims.

I claim:

1. A saddle element which comprises a supporting plate carrying an upright pivot having a ball portion at its lower end, two side stakes laterally hinged to said supporting plate, rope fixing means connected to said side stakes, and two supporting rollers connected to said supporting plate and extending below the same.

2. In a saddle tractor which comprises a frame mounting two track belts and a saddle element having an upright pivot connecting said saddle element to and supporting it on said frame, the provision of a platform carried by said frame at the top of the rear part of the tractor and bearing means carried by said platform and providing at least two bearing points spaced in the longitudinal direction of the tractor and located above said track belts vertically above the area defined by the points of support of the tractor on the ground, said pivot being detachably inserted in said bearing means selectively at any of said bearing points.

3. In a saddle tractor which comprises a frame mounting two track belts, and bearing means arranged on said frame vertically above the area defined by the points of support of the tractor on the ground, the combination of a platform carried by said frame at the top of the rear part of the tractor and mounting said bearing means above said track belts, and a saddle element comprising a supporting plate carrying an upright pivot detachably inserted in said bearing means to connect said saddle element to and support it on said frame, two side stakes laterally hinged to said supporting plate, rope fixing means connected to said side stakes, and two supporting rollers connected to said supporting plate and resting on said platform.

References Cited in the file of this patent

UNITED STATES PATENTS

| | | |
|---|---|---|
| 1,084,820 | Pescatore | Jan. 20, 1914 |
| 1,359,379 | Holmes | Nov. 16, 1920 |
| 1,377,609 | Townsend | May 10, 1921 |
| 1,588,719 | French | June 15, 1926 |
| 1,793,545 | De Rocher | Feb. 24, 1931 |
| 1,987,688 | Lamb | Jan. 15, 1935 |
| 1,990,731 | Greer | Feb. 12, 1935 |
| 2,312,769 | Mosling | Mar. 2, 1943 |
| 2,321,198 | Graves | June 8, 1943 |
| 2,413,048 | Hurd | Dec. 24, 1946 |
| 2,550,230 | Dalton | Apr. 24, 1951 |

FOREIGN PATENTS

| | | |
|---|---|---|
| 56,298 | Denmark | June 12, 1939 |